United States Patent
Nakatani et al.

(10) Patent No.: US 7,266,644 B2
(45) Date of Patent: Sep. 4, 2007

(54) STORAGE SYSTEM AND FILE-REFERENCE METHOD OF REMOTE-SITE STORAGE SYSTEM

(75) Inventors: Yoji Nakatani, Yamato (JP); Manabu Kitamura, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 95 days.

(21) Appl. No.: 10/766,022

(22) Filed: Jan. 29, 2004

(65) Prior Publication Data
US 2005/0091448 A1   Apr. 28, 2005

(30) Foreign Application Priority Data
Oct. 24, 2003   (JP)   ............... 2003-364793

(51) Int. Cl.
*G06F 12/00* (2006.01)
(52) U.S. Cl. .................................... 711/124
(58) Field of Classification Search ............... 711/161, 711/162; 709/203, 212, 219, 227, 231; 707/201, 707/203
See application file for complete search history.

(56) References Cited

U.S. PATENT DOCUMENTS

| | | | |
|---|---|---|---|
| 5,592,618 A | | 1/1997 | Micka et al. |
| 5,754,888 A | * | 5/1998 | Yang et al. ............... 710/52 |
| 6,442,551 B1 | | 8/2002 | Ofek ........................ 707/10 |
| 6,823,336 B1 | * | 11/2004 | Srinivasan et al. ........... 707/8 |
| 2002/0016792 A1 | * | 2/2002 | Ito et al. ................. 707/200 |
| 2003/0046602 A1 | | 3/2003 | Hino et al. ................. 714/4 |
| 2003/0135514 A1 | * | 7/2003 | Patel et al. .............. 707/102 |
| 2003/0158869 A1 | | 8/2003 | Micka |
| 2003/0163553 A1 | * | 8/2003 | Kitamura et al. .......... 709/219 |
| 2003/0182313 A1 | * | 9/2003 | Federwisch et al. ........ 707/200 |
| 2003/0182322 A1 | * | 9/2003 | Manley et al. ............. 707/201 |
| 2003/0229764 A1 | | 12/2003 | Ohno et al. |
| 2004/0172509 A1 | | 9/2004 | Takeda et al. |
| 2004/0193952 A1 | | 9/2004 | Narayanan et al. |

FOREIGN PATENT DOCUMENTS

JP   2003-76592   3/2003

OTHER PUBLICATIONS

Minwen Ji, Alistar Vietch, John Wilkes, "Seneca: Remote Mirroring Done Write", Proceedings of USENIX Technical Conference, pp. 253-268, Jun. 2003, USENIX, Berkely, CA.*

* cited by examiner

*Primary Examiner*—Donald Sparks
*Assistant Examiner*—Jesse Diller
(74) *Attorney, Agent, or Firm*—Mattingly, Stanger, Malur & Brundidge, P.C.

(57) ABSTRACT

A storage system conducting remote copy functions such that, when data is updated at a local site, contents of the update can be referred to in real time by storage at a remote site. A disk-control unit at a remote site receives file data written in accordance with an update of a file in a storage system at a local site and a history of the file-management information from the storage system at the local site and stores the data and the history. A file-system processing unit refers to the history and updates the file-management information in a file-system cache in accordance with the update of the file in the storage system at the local site. When a client issues a read request, the file-system processing unit refers to the file-management information updated in the file-system cache and transfers the contents of the update of the file to the client.

12 Claims, 6 Drawing Sheets

STORAGE SYSTEM AND FILE-REFERENCE METHOD OF REMOTE-SITE STORAGE SYSTEM

BACKGROUND OF THE INVENTION

This invention relates to the remote copy of data between two storage systems that are situated at a geographic distance from, and coupled to, each other. When the data of one storage system is updated, the updated contents are transferred, or remotely copied, to the other storage system so that both systems have the same data. More specifically, this invention relates to a technique for effecting the copying of data by a remote copy function in a file system.

Methods for effecting remote copy of data between storage systems are known (see, for example, U.S. Pat. No. 6,442,551 and Japanese Unexamined Patent Publication No. 2003-76592). According to these methods, when the data of a disk drive at a certain location (a local site) is updated, the updated contents are transferred to a disk drive at another location (a remote site) so that the two disk drives have the same data.

According to the method disclosed in U.S. Pat. No. 6,442,551 and Japanese Unexamined Patent Publication No. 2003-76592, the storage system at a remote site is used as a standby system; i.e., when the local site becomes inaccessible, the storage system at the remote site is used as a file system.

SUMMARY OF THE INVENTION

The data stored in a storage system at a remote site is inaccessible unless fail-over (the handing over of duties from the local site to the remote site) takes place due to trouble at the local site, or data transfer between the local and remote sites is stopped (execution of a split or cancellation of pairing). U.S. Pat. No. 6,442,551 discloses a system wherein two or more disk drives, serving as a mirror, store the same data and are accessible only after the mirror is canceled. According to the system disclosed in Japanese Unexamined Patent Publication No. 2003-76592, pair volumes are established between storage devices with the function of remote-copy, and one upper layer device possesses the pair volumes exclusively and rejects update requests from another upper layer device. Thus, the pair volumes are recognized as one volume by the storage systems.

The reason why a "split" is necessary, as described in U.S. Pat. No. 6,442,551, is that, if the disk drive is mounted at the remote site while the data transfer between the local site and the remote site continues, the mounted disk drive becomes inaccessible because of the problems indicated below.

The first problem is as follows. If the user data of the local disk is transferred to the remote disk, the local file system caches metadata (which is file-management information to be discussed later in more detail), and the metadata is not written into the storage device at the local site, if the file system is in the process of journaling; therefore, under these circumstances, the contents of the update at the local site are not reflected at the remote site.

The second problem is as follows. The file system at the remote site has its own cache memory. If the contents of the disk drive at the remote site are updated, the contents of cache memory at the remote site are not updated; accordingly, the latest file data is not referred to when the cache is accessed. If the cache memory of the file system at the remote site stores pre-update data, the file system uses the pre-update data, with the result that the pre-update file data is referred to instead of the latest file data.

In light of the foregoing problems, a storage system is provided in accordance with the present invention wherein, when the data of a file system at a local site is updated, the updated contents are sent to a file system at a remote site in such a way that the latest file data can be referred to at the remote site.

This storage system comprises (i) a disk device, (ii) a file server, and (iii) interfaces for sending and receiving data to and from the disk devices of other storage systems through communication links. The disk device includes at least one disk drive to store data, a disk-control unit to control the writing and reading of data into and from the disk drive or drives, and a disk cache for transmitting and receiving data to and from the disk drive or drives. The file server includes a CPU for performing various kinds of processing, a main memory to store programs and data for the CPU, and a network interface to be connected to clients through a network. The main memory includes a file system-processing unit and a file-system cache. The file system-processing unit carries out various kinds of processing of the file system, which manages the areas of the disk drive or drives, so that the files are correlated with the data locations in the disk drive or drives. The file-system cache is a buffer to be used by the file system.

The disk-control unit at a remote site receives the updated contents and historical information about management of a file in the disk device at a local site through a communication link and stores the updated contents and the historical information in the disk device at the remote site. The disk-control unit at the remote site refers to the history of the file-management information in the disk device at the remote site and updates the information in the file-system cache at the remote site in accordance with the update of the file at the local site.

When a client issues a read request at the remote site, the disk-control unit at the remote site refers to the file-management information in the file-system cache at the remote site and makes it possible for the updated contents of the file to be transferred to the client.

DESCRIPTION OF THE PREFERRED EMBODIMENTS

Figure 1:
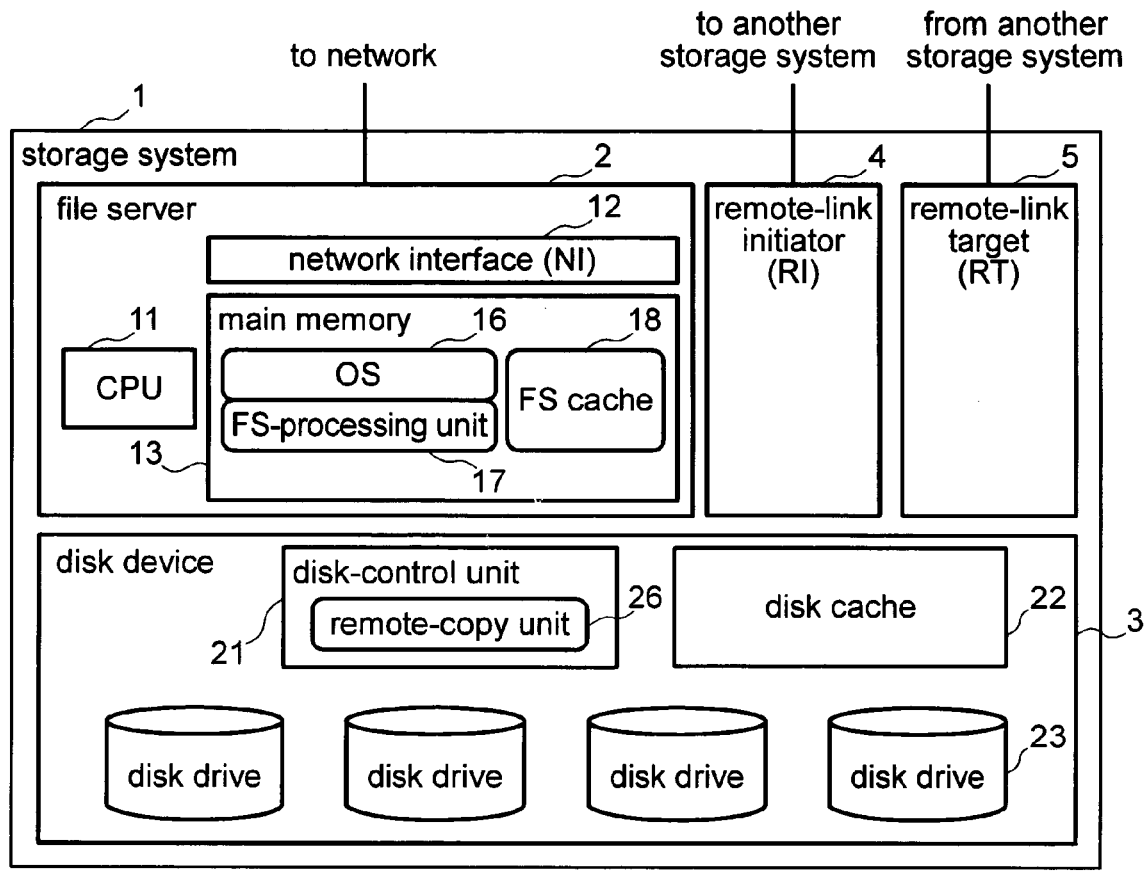
FIG. 1 is a block diagram of the storage system in accordance with a preferred embodiment of the present invention.

Referring to the drawings, a preferred embodiment of the storage system of the present invention will be described in detail. However, this invention is not limited to the embodiments described below.

In FIG. 1, the numeral 1 indicates a storage system, which is connected to a network, and comprises (i) a file server 2 which mainly manages files, (ii) a disk, or storage, device 3 which processes the file server's requests for input and output of data and stores the file data, (iii) a remote-link initiator (RI) 4 which serves as an interface to mainly send data to another storage system 1, and (vi) a remote-link target (RT) 5 which serves as an interface to receive data from another storage system 1.

Although the file server 2 is included in the storage system 1 in FIG. 1, the former may be placed outside the latter and connected to the latter through an interface, such as a fiber optic channel.

The file server 2 is a computer comprising a network interface (NI) 12 for effecting connection to the network, a CPU 11 to carry out various kinds of processing, and a main memory 13 for storing programs and data for use by the CPU 11. The main memory 13 stores an OS 16 for use by the CPU 11 and comprises a file system-processing unit (FS-processing unit) 17 to carry out various kinds of processing of the file system and a file-system cache (FS cache) 18 or a buffer to be used by the file system. The FS cache 18 temporarily stores data read from the disk device 3 and data inputted by a client 6 through the network. In other words, the FS cache 18 stores the contents of a file (user data), as well as metadata about the file, which constitutes data for file management (for example, the file name, file size, data-storage location, and dates and times of update of the file), a journal log which contains a history of the update of the metadata (time-series historical information about metadata), and so on.

The file system described above is designed to allow access to data as a file by managing the disks. There are two types of access: write and read. In the case of writing, the file system determines which area of which disk the data should be written into and writes the data in that area. If the remaining space of the area allocated to the file is too small, another area is allocated to the file and data is written into the file in that area. In the case of reading, the file system finds which area of which disk the contents of the file are stored in and reads the data from that area. Thus, allowing access to data as a file involves the need to correspond the contents of files to locations on the disks.

The disk device 3 comprises (i) disk drives 23 which include magnetic media and which store data, such as the contents of files, (ii) a disk-control unit 21 which controls the disk drives 23, and (iii) a disk cache 22 which is controlled by the disk-control unit 21 and is used for transmitting and receiving data to and from the disk drives 23. A plurality of physical disk drives, such as a disk array of the RAID (Redundant Arrays of Inexpensive Disks) type, may be used instead of a single physical disk drive.

The disk cache 22 comprises a nonvolatile memory with a battery so that the data stored in it will not be lost even if the power supply is disturbed. According to the input and output of data from the file server 2, data-storing areas (cache entries) are allocated in the disk cache 22, and the data received from the file server 2, as well as the data read from the disk drives 23, are temporarily stored in such areas. Besides, the disk cache 22 carries out the preparation of data for remote copy according to the writing from the file server 2 and the temporary storage of data for remote copy received from another storage system 1 through the remote-link target (RT) 5.

With the above configuration, access to a certain file in the disk device 3 is accomplished by reading the file's metadata, which is file-management information and includes the data-storing location, from the disk device 3 into the disk cache 22 and referring to the metadata.

Figure 2:
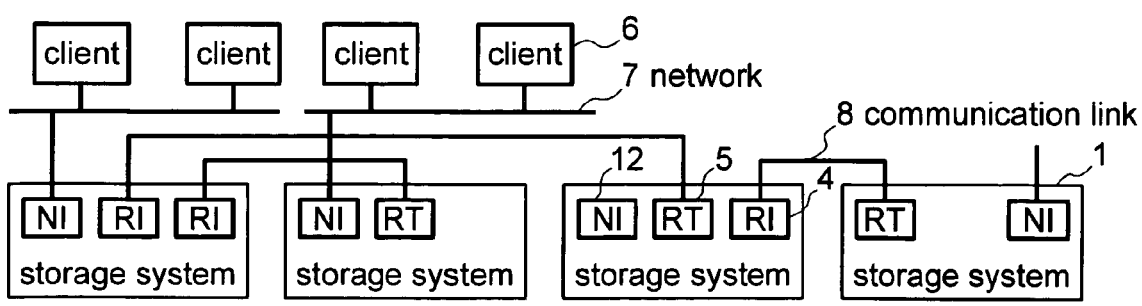
FIG. 2 is a block diagram which shows a plurality of storage systems of the type shown in FIG. 1, which are coupled together for effecting remote copy of data.

In the integrated system of FIG. 2, a storage system 1 receives a request for processing from a client 6 that is connected through the network 7 to a network interface (NI) 12. The remote-link initiator (RI) 4 of the storage system 1 is connected to the remote-link target 5 of another storage system 1 located at a geographic distance through a communication link 8, such as a dedicated line, by way of a fiber channel. As shown in FIG. 2, a storage system 1 may be provided with a plurality of remote-link initiators (RI) 4, and it may be coupled to a plurality of other storage systems 1; or, each of the storage systems 1 may be provided with a remote-link initiator (RI) 4 and a remote-link target (RT) 5, and the storage systems 1 may be connected in series. Each disk drive 23 (hereinafter "initiator disk drive 23") of the disk device 3 of a storage system 1 with a remote-link initiator (RI) 4 is connected to a disk drive 23 (hereinafter "target disk drive 23") in the disk device 3 of another storage system 1 with a remote-link target (RT) 5, both systems being mutually connected so as to constitute a pair. When data is entered into an initiator disk drive 23, the same data is transferred to its counterpart, a target disk drive 23, so that the two disk drives 23 in a pair have the same data.

Remote copy may be carried out by a synchronous method or an asynchronous method. According to the synchronous method, the entry of update data into a disk drive 23 at a local site and the transfer of the same data to a disk drive 23 at a remote site take place simultaneously. The update processing at the local site is finished when the transfer of the update data to the remote site is completed. According to the asynchronous method, the update processing at a local site is finished without waiting for the transfer of the update data to a remote site to be completed. In either case, update data is transferred to the remote site and the remote site is updated in the order of update at the local site.

Figure 3:
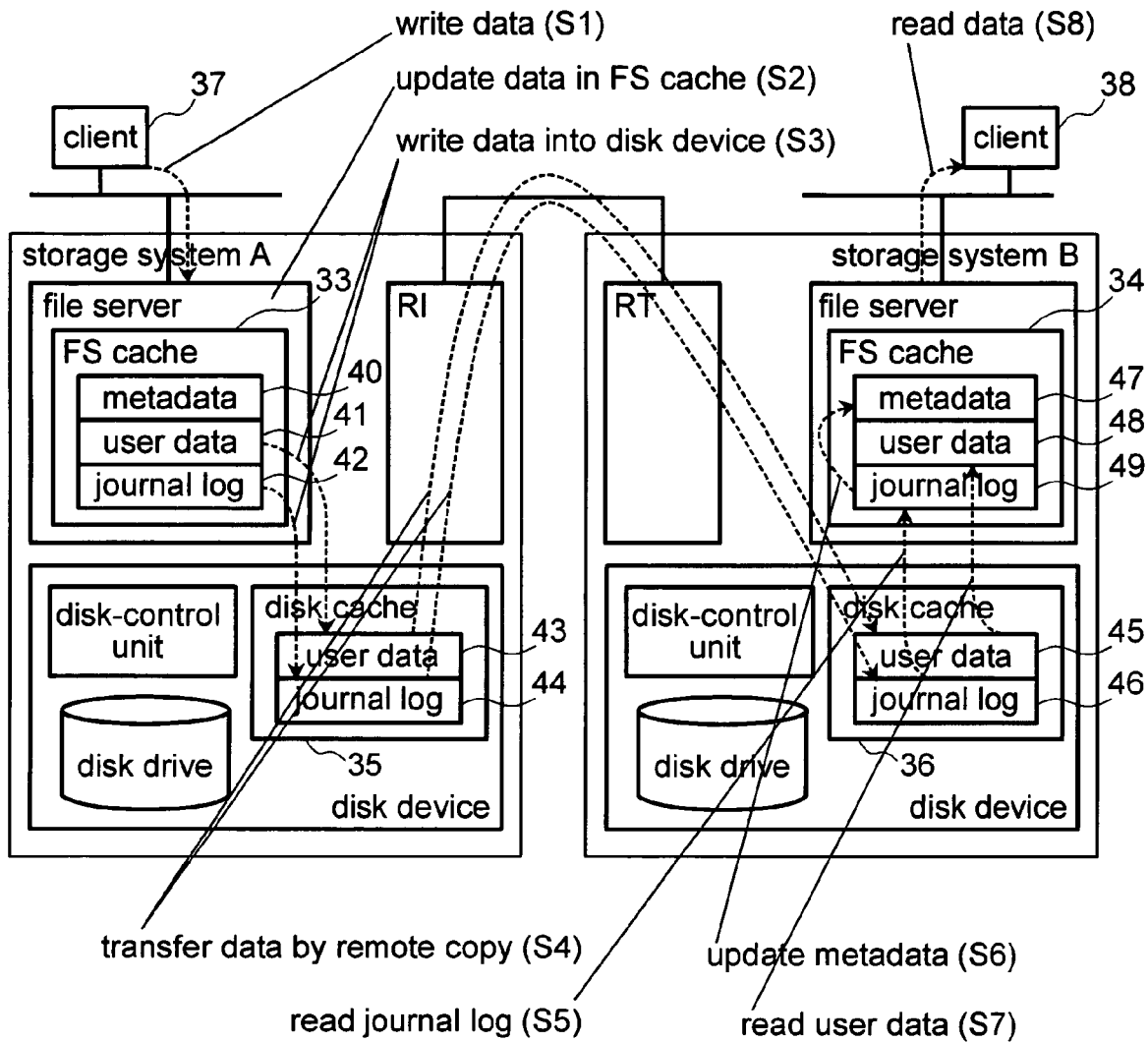
FIG. 3 is a diagram which illustrates the process of data transfer between two storage systems of the type shown in FIG. 1, one situated at a local site and the other at a remote site, and processing of a reference to file data at the remote site.

Referring to FIG. 3, an outline of data transfer between a local site and a remote site and reference to the latest file data at the remote site will now be described. In FIG. 3, two storage systems A and B, which are located at a geographic distance from each other, are connected through a remote-link initiator R1 and a remote-link target RT. The data flow will be described on the assumption that a client 37, who is connected to the storage system A through a network, writes data into the storage system A, and then another client 38, who is connected to the storage system B through a network, reads data from the storage system B.

The client 37 at the local site issues a write request to the file server of the storage system A, and update data is transferred from the client 37 to the storage system A (Step S1). Then, the FS-processing unit in the storage system A updates the metadata 40, the user data 41, and the journal log 42 in the FS cache 33 (Step S2) at the local site.

The updated user data 43 and the updated journal log 44 of the FS cache 18 are synchronously written into the disk cache 35 in the storage device (Step S3). Then, the remote-copy unit prepares data for remote copy and transfers the data to the storage system B.

The data transferred from the storage system A is reflected in the disk cache 36 of the storage system B, and the user data 45 and the journal log 46 in the disk cache 36 of the storage system B are updated so that their contents are the same as those of the user data 43 and the journal log 44 of the storage system A (Step S4). When the journal log 46 in the disk cache 36 is updated, a metadata-update monitor detects the update (refer to the following explanation with reference to FIG. 4) and a metadata-updating unit reads the journal log 46 into the FS cache 34 (Step S5). The metadata-updating unit updates the metadata 47 in the FS cache 34 by using the journal log 49 thus read out (Step S6). Then the metadata is updated, an FS-cache purger discards the user data 48 in the FS cache 34 corresponding to the pre-update metadata.

Then a client 38 at the remote site issues a read request to the storage system B, the user data 45 is read from the disk device based on the updated metadata and stored into the FS cache 34 (Step S7). Then, the user data 48 is transferred to the client 38 as a response to the read request from the client 38 (Step S8). Thus, the client 38 at the remote site can refer to the contents of the file written by the client 37 at the local site.

Again, referring to FIG. 3, the outline of a data transfer between a local site and a remote site and a reference to the latest file data at the remote site will be described. Access to a file in the disk device of a storage system is made by reading metadata, or data for file management, into the FS cache, referring to the metadata thus read out, finding the location of the data of the file, and making access to the file. If (i) a client makes access to the storage system at the remote site after user data and a journal log, or a history of file-management information, have been transferred from a storage system at a local site to a storage system at a remote site, and (ii) the metadata for old user data still remains in the FS cache of the storage system at the remote site, the FS (File System) processing unit of the storage system at the remote site will refer to the old metadata and will fail to make access to the new user data that has been transferred from the local site (because the old metadata includes the storage location of the old user data, access to the new user data cannot be accomplished by referring to the old metadata).

To solve the above-described problem, new metadata is stored in the FS cache of the storage system at the remote site by using the journal log or the history of file-management information which, together with the user data, was sent from the storage system at the local site. If the old user data still remains in the FS cache at the remote site, the old user data will be read from the FS cache in response to a client's read request; therefore, the old user data in the FS cache at the remote site must be discarded. Thus, when a client at the remote site issues a read request, reference is made to new metadata in the FS cache, whereby access is made to the file of new user data.

Figure 8:
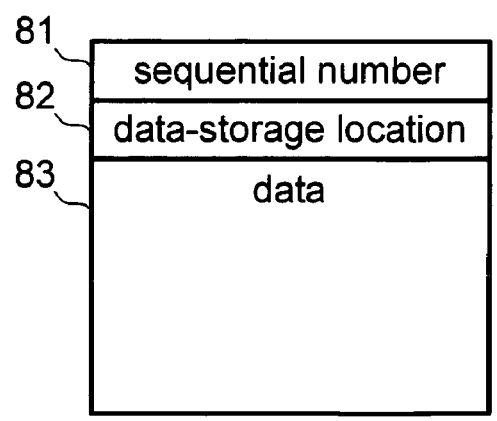
FIG. 8 is a diagram which illustrates an example of the configuration of data for remote copy to be transferred to the remote site.

Now the functions and tasks of each unit of each storage system during data transfer from the local site to the remote site will be described. FIG. 8 shows an example of the structure of remote-copy data to be prepared at the local site and transferred to the remote site. The sequential number entry 81 is the serial number of the update at the local site. The data of the storage system at the remote site is updated in the order of the sequential number to assure that the update order at the remote site is the same as the update order at the local site. The data-storage location entry 82 contains information to identify the target disk drive at the remote site and information about the data-storage location in the target disk drive. The data 83 represents the contents of update data at the local site and which is to be stored in the data-storage location 82 at the remote site.

Figure 5:
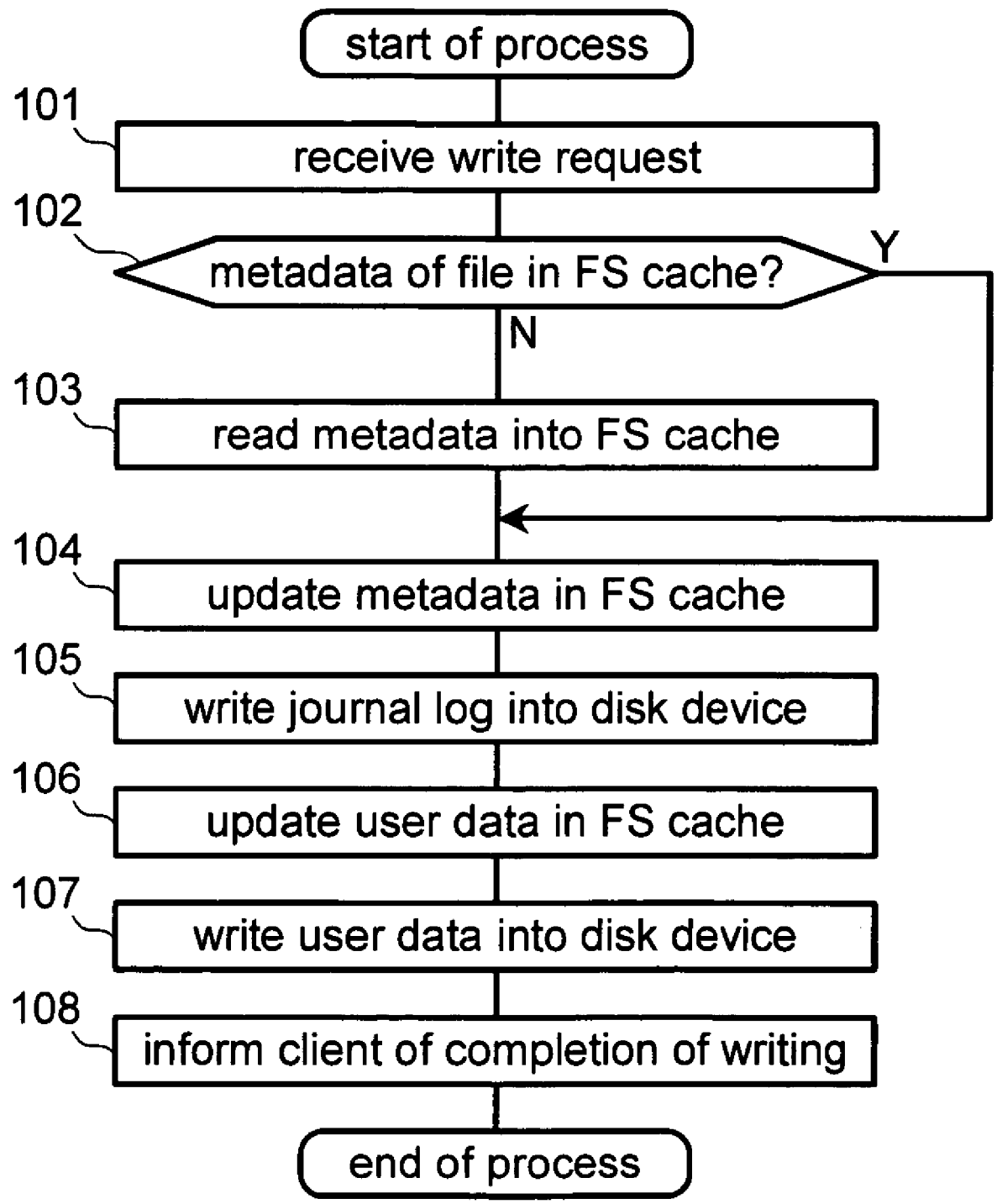
FIG. 5 is a flowchart of the processing of a client's read request as performed by the file system-processing unit of the storage system of FIG. 1 at a local site.

FIG. 5 shows the flow of the processing carried out by the FS (File System)-processing unit 17 of a storage system 1 in response to a client's write request. The FS-processing unit 17 receives a write request from a client 6 who is connected to a storage system 1 through a network 7 (Step 101). In Step 102, it is checked to determine whether there is metadata of the file to be processed in the FS cache 18. If not, the process goes to Step 103 to read the metadata from the disk device 3 into the FS cache 18.

In order for the FS-processing unit 17 to process a file, the necessary data (user data and metadata) have to be in the FS cache 18. If not, the FS-processing unit 17 reads the necessary data from the disk device 3 into the FS cache 18 as described above. The data thus read into the FS cache 18 is not discarded after the intended processing is finished, but is kept in the cache 18. Thus, if necessary, any of the data in the FS cache 18 can be used again without reading the same from the disk device 3 into the cache 18. Thus, the efficiency of processing is raised.

After reading necessary metadata from the disk device 3 into the FS cache 18 in Step 103, the FS-processing unit 17 updates the metadata in the FS cache 18 in Step 104. At the same time, the FS-processing unit 17 prepares a journal log corresponding to the contents of the update and writes the journal log into the disk device 3 (Step 105).

A journal log consists of log information (information about the update history of metadata) to be stored in a journal-log area 90 (see FIG. 9) of a disk drive 23. The contents of the update of metadata by the FS-processing unit 17 are recorded as log information in the order of update. The recording of a new journal log is started at the position indicated by an end pointer 92, and the position indicated by the end pointer 92 is moved to a position next to the recorded location. A start pointer 91 indicates the start position of a journal log, including metadata whose update is not yet completed in the disk device 3. The FS-processing unit 17 writes the metadata of the FS cache 18 into the disk device 3 as the need arises and moves the position of the start pointer 91 ahead. In other words, once the metadata of the FS cache 18 has been timely written into a disk drive, the position of the start pointer can be moved ahead. After reaching the end of the log-data area 93 in the journal-log area 90, the positions indicated by the start and end pointers 91 and 92 are moved to the head. With this wraparound movement, they indicate positions within the log-data area 93.

The journal log in the log-data area 93, defined by the positions indicated by the start and end pointers 91 and 92, indicates the region in which a journal log corresponding to metadata, which has not been stored in the disk device 3 yet, is stored. In other words, once metadata reflecting the contents of an update are stored into a disk drive, it is unnecessary to define the journal log corresponding to the metadata with the start and end pointers.

By writing the journal log into the disk device 3, it becomes unnecessary for the FS-processing unit 17 to write the updated contents of metadata into the disk device 3 before finishing the processing for the client 6. This is because the data can be restored based on the journal log if the data in the FS cache 18 is discarded due to trouble.

If trouble, such as power failure, occurs, the updated contents of metadata, which is in the FS cache 18, but has not yet been written into the disk device 3, are lost in the FS cache 17. After restoration of the power supply, the metadata in the disk device 3 may be read to find that they are not updated. Therefore, the FS-processing unit 17 reads the journal log from the disk device 3 and updates the contents of metadata by using the contents of the journal log in the area defined by the start and end pointers 91 and 92. Thus, the metadata in the FS cache 18 is restored to the latest pre-trouble state.

After writing the journal log into the disk device 3 in Step 105 of FIG. 5, the disk-control unit 21 allocates an area in the FS cache 18 as the need arises and reads the user data from the disk device 3 into the FS cache 18. Then, the disk-control unit 21 updates the user data received from the client 6 in the FS cache 18 (Step 106), writes the updated user data into the disk device 3 (Step 107), and informs the client 6 of the completion of update processing (Step 108).

As described above, in response to a client's write request, the FS-processing unit 17 updates the metadata, prepares a journal log, and updates the user data in the FS cache 18. The journal log thus prepared and the user data thus updated are written into the disk device 3 before the client is informed of the completion of update processing. This is called "synchronous writing." On the other hand, the updated metadata in the FS cache 18 may be written into the disk device 3, if necessary, but independent of the processing of the client's write request ("asynchronous writing").

The flowchart of FIG. 5 represents a case in which the user data is written into the disk device 3 (step 107 in FIG. 5) synchronously with the client's write request. However, in the case of some file systems, the user data in the FS cache 18 is updated in response to a client's write request, and the updated user data is written into the disk device 3 only when the FS-processing unit 17 receives a commit request for the client 6. In such a case, the updated user data is written into the disk device 3 a synchronously with the client's write request and synchronously with the client's commit request.

Figure 6:
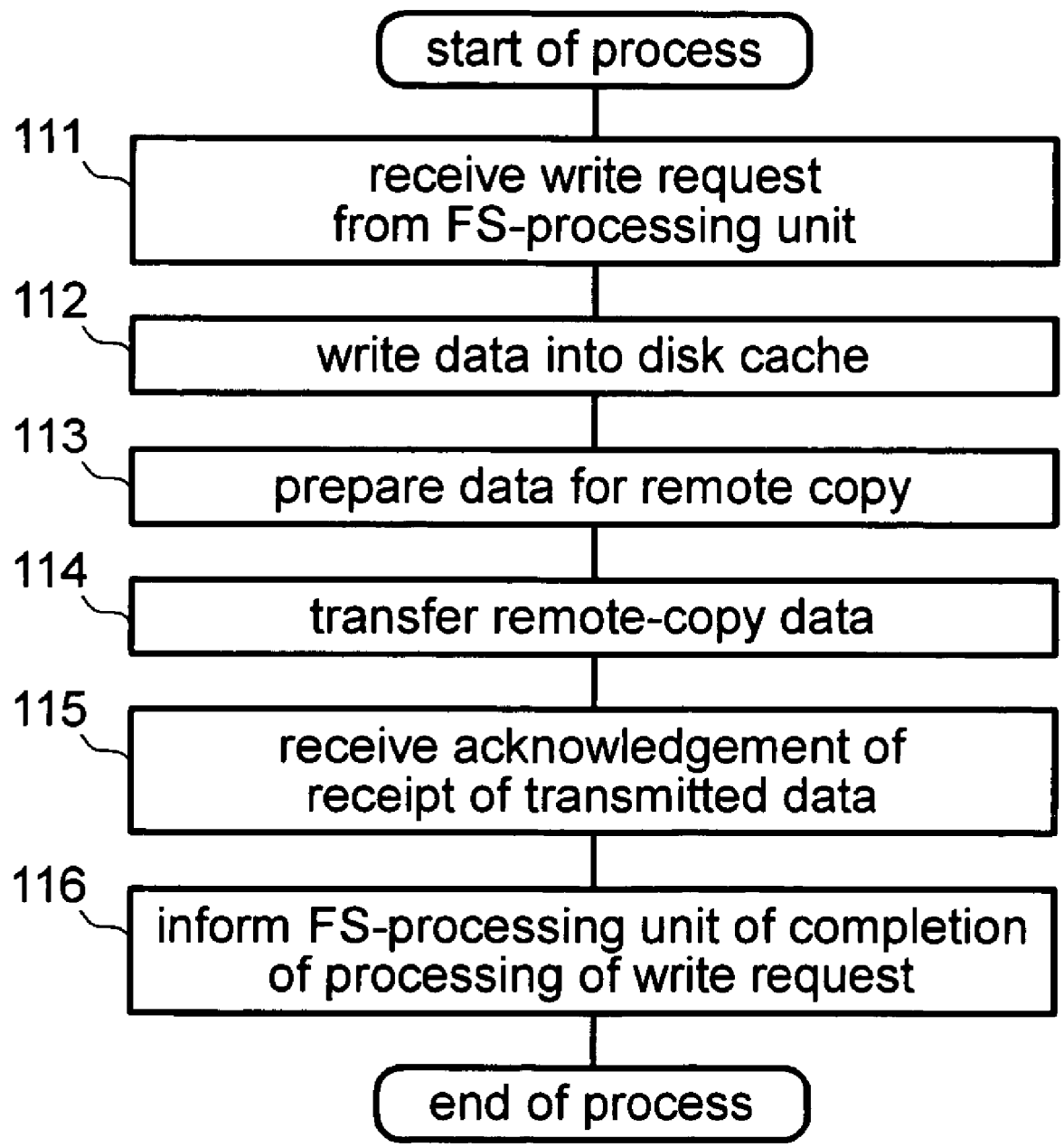
FIG. 6 is a flowchart of the processing of remote copy of data by the disk-control unit of the storage system, when data is written into the disk device of the storage system of FIG. 1 at a local site.

Now, the process of remote copy by the disk-control unit 21 will be described. FIG. 6 is a flowchart of the process of remote copy by the disk-control unit 21. The disk-control unit 21 receives a write request from the FS-processing unit 17 in Step 111 and writes the data into the disk cache 22 in Step 112. Then the data has been written, the remote-copy unit 26 of the disk-control unit 21 prepares data for remote copy in the disk cache 22 in Step 113 and transfers the data to another storage system 1 at a remote site through the remote-link initiator (RI) 4 and the remote-link target (RT) 5 in Step 114. The remote-copy unit 26 receives an acknowledgement from the storage system at the remote site in Step 115 and informs the FS-processing unit 17 of the completion of the processing of the write request in Step 116.

The storage system at the remote site receives the remote-copy data through its remote-link target (RT) 5 and reflects in itself the update data included in the remote-copy data. When the file server 2 of the storage system 1 at the remote site receives a read request (a client, who is coupled to the storage system 1 at the remote site, issues a read request through the file server 2), the updated data is sent to the file server 2. The reflection of update data to the storage system at the remote site is carried out in the disk cache 22. The disk-control unit 21 calculates a storage location from the data-storage location 82 in the remote-copy data, which is not received through the file server 2, but is received through the remote-link target (RT) 5. Entry to the storage location is allocated in the disk cache 22, and new data is written there. In this way, the contents of the remote-copy data are reflected one after another in the disk device 3 of the storage system at the remote site so, that the user data in the storage system at the remote site is the same as the user data in the storage system at the local site.

As described above, the user data and the metadata received through the remote-link target (RT) 5 and written into the disk device 3 are not passed through the file server 2; therefore, the data of the FS cache 18 of the file server of the storage system at the remote site has to be updated so that the client at the remote site can refer to the updated user data. The file servers 2 of storage systems at the local and remote sites have respective FS caches 18, which have respective data. In the case of conventional storage systems, therefore, the FS-processing unit 17 at the remote site, will refer to the old data before update, thereby failing to process the read request of client 6 correctly.

Figure 4:
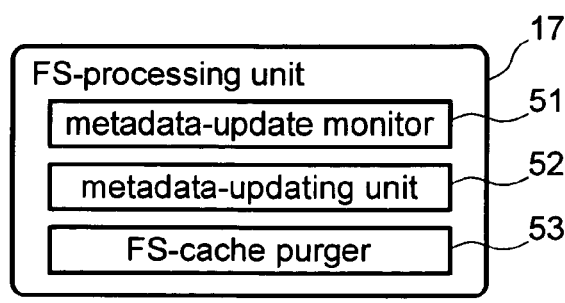
FIG. 4 is a diagram which illustrates an example of the configuration of the file system-processing unit of the file server of the storage system of FIG. 1.

To solve the above-described problem, the FS-processing unit 17 of the storage system 1 according to the present invention comprises a metadata-update monitor 51, a metadata-updating unit 52, and a FS-cache purger 53, as shown in FIG. 4.

Figure 9:
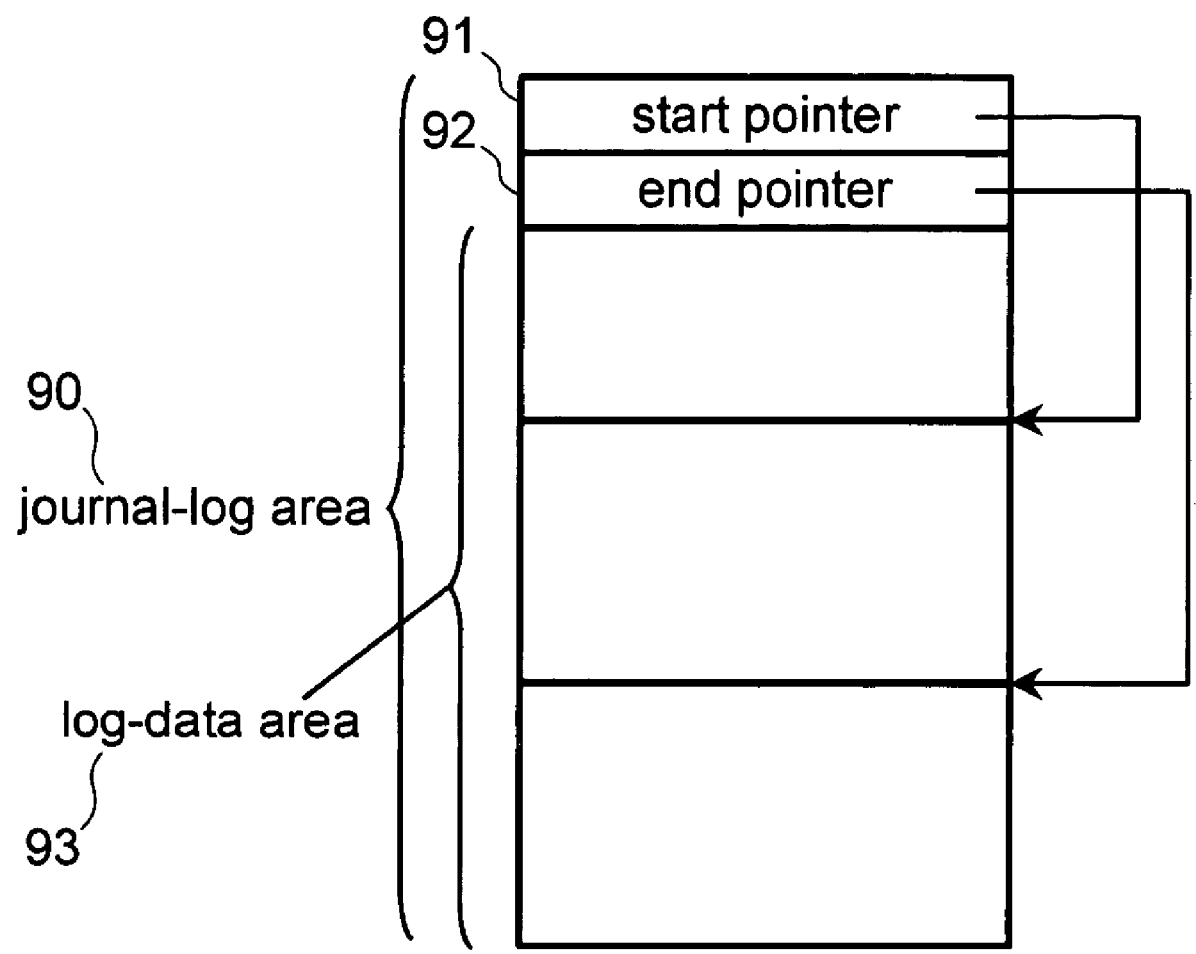
FIG. 9 is a diagram which illustrates information to be stored in the journal-log areas in the disk drives of the disk device of the storage system of FIG. 1.

The metadata-update monitor 51 detects an update of files in the disk device 3 at the remote site. The detection of an update can be made by, for example, monitoring the writing of data into the journal-log area in the disk device 3. As shown in FIG. 9, the journal log uses a certain wraparound log-data area 93; accordingly, there is an end pointer 92 which indicates where to write the journal log next. The update of a file, or the update of metadata, can be detected by reading the end pointer 92 regularly and detecting a change in its value.

Then the metadata-update monitor 51 detects the update of a file, or the update of metadata in the disk device 3, the metadata-updating unit 52 updates the metadata of the file in the FS cache 18 in accordance with the update in the disk device 3. As shown by the flow of processing in FIG. 5, the update of metadata in the disk device 3 is not carried out synchronously with the write request of the client 6. Therefore, if metadata in the disk device 3 were read at the remote site, the old metadata before update would be read out. Accordingly, the metadata-updating unit 52 updates the metadata by using a journal log. The contents of the update of metadata at the local site are recorded in the journal log. Therefore, it is possible to update the contents of metadata at the remote site by using such a journal log.

The FS-cache purger 53 discards the user data in the FS cache 18. A file corresponding to the metadata updated by the metadata-updating unit 52 is the file to which data is written at the local site, and the user data of the file in the FS cache 18 may be of the value before update. The FS-cache purger 53 discards the pre-update data in the FS cache 18, which makes it possible, upon request for reference by the client 6 at the remote site, to read updated user data from the disk device 3 into the FS cache 18 and refer to the new user data.

Figure 7:
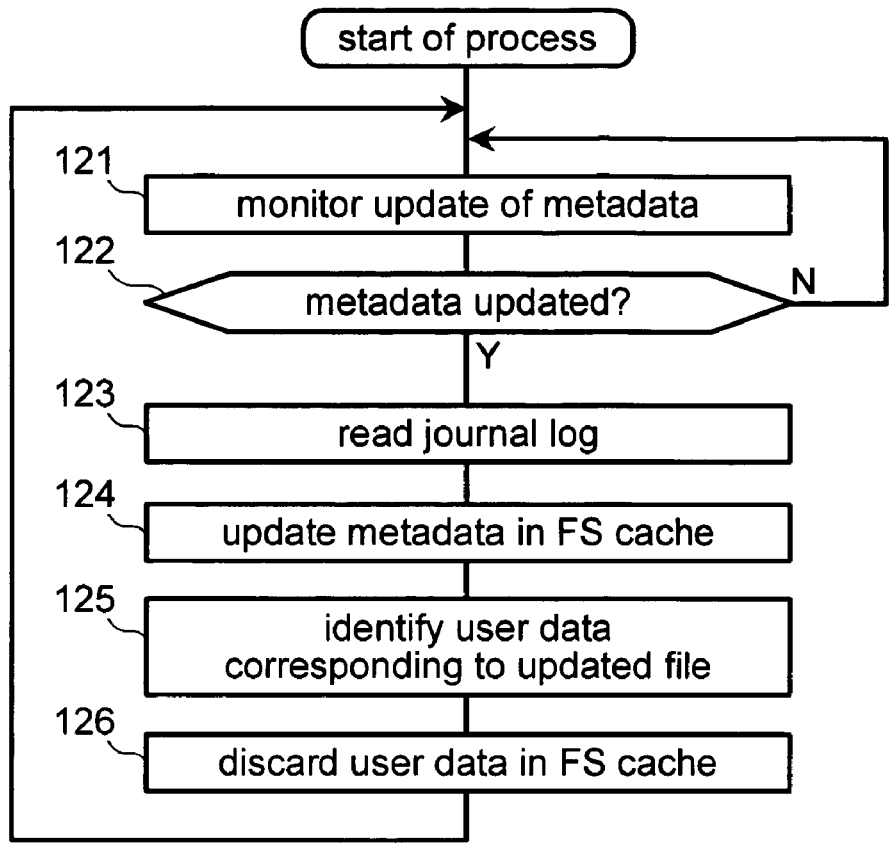
FIG. 7 is a flowchart of the processing by the file system-processing unit of the storage system of FIG. 1 at the corresponding remote site when a file is updated at a local site.

FIG. 7 shows the flow of processing executed, when a file is updated, by the above three components (the metadata-update monitor, the metadata-updating unit, and the FS-cache purger) in the FS-processing unit 17 at the remote site to reflect the contents of the FS cache 18 correctly. First, in Step 121, the metadata-update monitor 51 monitors the update of metadata. When an update of the metadata is detected, the process advances from Step 122 to Step 123. In Step 123, in order for the updated contents of the metadata to be reflected in the FS cache 18, the metadata-updating unit 52 reads an updated journal log. Then, in Step 124, the metadata-updating unit 52 updates the contents of the metadata according to the contents stored in the journal log. Further, in Step 125, the FS cache-purger 53 identifies a user-data area of the updated file from the updated metadata. In Step 126, when a cache entry corresponding to the area exists in the FS cache 18, such a cache entry is discarded.

The metadata updated in Step 124 has to be managed as metadata which is altered in the FS cache 18 at the remote site and to be held by the FS cache 18. This is because the metadata has not been updated in the disk device 3 at the remote site. If the metadata in the FS cache 18 is made invalid, the old data before update may be read from the disk device 3 and used. Further, in order to have its data match that of the local site, the disk unit 3 at the remote site is sometimes write-protected. In such a case, the contents of the metadata updated in Step 124 cannot be written into the disk device 3 by the FS-processing unit 17 of the remote site. Therefore, the metadata is held in the FS cache 18 until the metadata is updated in the disk device 3 at the local site, and it is stored in the disk device 3 at the remote site.

It is possible to detect the update of the metadata in the disk device 3 by using the start pointer 91 of the journal-log area 90. While the journal data on which the update of the metadata is based is stored in an area between positions designated by the start pointer 91 and the end pointer 93, the metadata may not have been stored in the disk device 3. When the position indicated by the start pointer 91 is renewed and the journal data which has caused the update of the metadata is out of a region defined by the start pointer 91 and the end pointer 93, the metadata has been written into the disk device 3 at the local site before the renewal of the position indicated by the start pointer 91, and the FS cache 18 can release the metadata.

Even if the cache entry is discarded in Steps 125 and 126, when the client 6 at the remote site requests a reference before an update of the user data at the remote site, there is a possibility that the user data before update is read into the FS cache 18 again. In order to prevent the data before update from being read out, it is necessary to start Steps 125 and 126 after confirming that the user data has been updated to read data there until the update of the user data has been completed. The journal log is used to confirm the completion of the update of the user data. In this case, the FS-processing unit 17 has to write log data to the journal log indicating the completion of the update of the user data.

Further, in the case of a file system which accompanies a commit request, Steps 125 and 126 executed by the FS-cache purger 53 can be carried out using a journal log corresponding to the commit processing.

Also, in Step 126 of FIG. 7, the cache entry in the FS cache 18 is discarded. However, the user data remote-copied from the local site is stored in the disk cache at the remote site. When user data of a file corresponding to the updated metadata exists in the FS cache, in stead of discarding such user data, the FS-cache purger may read the user data of the file from a disk cache and store it in the FS cache.

The example of the file system that is processed by the FS-processing unit 17 as described so far is a journaling file system using journal logs. However, the system processed by the FS-processing unit 17 is not limited to a journaling file system. In such a case, the metadata-update monitor 51 in the storage system 1 at the remote site detects an update of the metadata by monitoring the update of data in the disk drive. There are methods conceivable for detecting an update of the metadata, such as a method in which the remote-copy unit 26 in the disk-control unit notifies the FS-processing unit 17 by interruption, etc., and a method in which the remote-copy units 26 writes into another disk drive 23 in the disk device 3 the information that the update took place and a storage location of the updated data and, further, the FS-processing unit 17 reads them regularly and their contents are updated so that the update of the metadata is detected.

The metadata-updating unit 52 only has to discard the updated metadata in the FS cache 18. In a case where the file system processed by the FS-processing unit 17 is one not using journals, the FS-processing unit 17 writes metadata into the disk device 3 synchronously with the request for writing from the client 6. This is because it becomes possible to refer to the metadata after update by discarding the data in the FS cache 18 and reading such data from the disk device 3 as needed. Further, the FS-cache purger 53 only has to discard user data, in the FS cache 18, corresponding to the metadata discarded by the metadata-updating unit 52.

As described above, in the storage system according to the invention, the file system at the remote site comprises the update monitor which monitors file updates or metadata updates, the updating unit which update the metadata, and the purger which discards data in the FS cache corresponding to a file where the update took place, thereby enabling the updated contents to be reflected in the file system at the remote site in real time in accordance with the update at the local site and making it possible to refer to the latest file data at the remote site.

Therefore, with regard to the storage system where remote copy is carried out, in accordance with the update at the local site, the contents of the update are reflected in real time in the file system at the remote site and the latest file data can be referred to at the remote site.

What is claimed is:

1. A storage system comprising:
at least one disk to store data;
a disk control unit to control writing and reading of data to and from said at least one disk;
a disk cache for transmitting and receiving data to and from said at least one disk;
a file server including a CPU, a main memory to store programs and data for said CPU, and a network interface to be coupled to clients through a network; and
interfaces for sending and receiving data to and from other storage systems through a communication link;
wherein said main memory includes a file system-processing unit managing storage areas of said at least one disk, so that files are correlated with data locations on said at least one disk, and a file-system cache to be used by said file system-processing unit;
wherein said disk control unit receives data of a file that has been updated in another storage system and a history of file-management information through said communication link and stores the received data of a file and the history of file-management information on the disk;
wherein said disk control unit refers to the history of the file-management information on the disk and updates file-management information in said file-system cache in accordance with the update of the file performed in said other storage system; and wherein, when said disk control unit receives a read request from a client coupled to the storage system, said disk control unit refers to the file-management information updated in said file-system cache and transfers the contents of the updated file to said client according to the file-management information, wherein said file system-processing unit comprises a metadata-update monitor monitoring the update of metadata, including data for file management, by referring to a journal log, including a history of said management information, and a metadata-updating unit updating the metadata in said file-system cache when said metadata-update monitor detects the update of a file.

2. The storage system of claim 1, wherein said file system-processing unit comprises, in addition to said metadata-update monitor and said metadata-updating unit, a file system-cache purger discarding the corresponding user data in said file-system cache when the metadata is updated by said metadata-updating unit.

3. The storage system of claim 2, wherein said metadata-updating unit updates metadata temporarily stored in said file-system cache by monitoring the contents of the journal log on said disk, and wherein said file system-cache purger discards said user data in said file system-cache by detecting that the user data, including the contents of the file temporarily stored in said file system cache, is updated on said disk corresponding to the update of said metadata.

4. The storage system of claim 1, wherein said metadata-update monitor detects the update of the file by monitoring the writing of data into a journal-log area on said disk.

5. A file-reference method of a storage system, wherein said storage system comprises:
   at least one disk;
   a disk control unit to control writing and reading of data to and from said at least one disk;
   a disk cache for transmitting and receiving data to and from said at least one disk;
   a CPU;
   a main memory to store programs and data for said CPU;
   a network interface to be coupled to clients through a network; and
   interfaces for sending and receiving data to and from other storage systems through a communication link;
   wherein said main memory includes a file system-processing unit managing areas of said at least one disk, so that files are correlated with locations of on said at least one disk, and a file-system cache to be used by said file system-processing unit;
   said file-reference method comprising:
   (a) a storing step in which said disk-control unit receives contents of a file that has been updated in another storage system and a history of file-management information through said communication link from said other storage system and stores the contents of a file and the history of file-management information on a disk;
   (b) a monitoring step in which said file system-processing unit refers to the history of the file-management information stored in said disk;
   (c) an updating step in which, based on a reference to the history of the file-management information, said file system-processing unit updates the file-management information in said file-system cache in accordance with the update of the file in said other storage system; and (d) a transfer step in which, when said disk-control unit receives a read request from a client coupled to the storage system ,the storage system refers to the file-management information updated in said file-system cache and reads, from the disk, the contents of the updated file and transfers the contents to said client, wherein said monitoring step includes a metadata-update monitoring step of monitoring the update of metadata, including data for file management, by referring to a journal log, including a history of said management information, and wherein said updating step includes a metadata-updating step of detecting the update of the file by said metadata-update monitoring step and updating the metadata in said file-system cache.

6. The file-reference method of claim 5, further comprising a file system-cache purging step of discarding user data corresponding to the updated metadata in said file-system cache when the metadata is updated in said metadata-updating step.

7. The file-reference method of claim 6,
   wherein said metadata-updating step includes a step of updating metadata temporarily stored in said file-system cache by monitoring the contents of the journal log on said disk, and
   wherein said file-system cache purging step includes a step of detecting that the user data, including the contents of the file temporarily stored in said file-system cache, has been updated on said disk corresponding to the update of said metadata and discarding said user data in said file-system cache.

8. The file-reference method of claim 5, wherein said metadata-update monitoring step includes a step of detecting the update of a file by monitoring the writing of data into a journal-log area on said disk.

9. A network system comprising:
   a first storage system; and
   a second storage system,
   wherein each of said first and second storage systems comprises:
   a disk;
   a disk-control unit to control writing and reading of data to and from said disk;
   a disk cache for transmitting and receiving data to and from said disk;
   a file server including a CPU, a main memory to store programs and data for said CPU, and a network interface to be coupled to clients through a network; and
   interfaces for sending and receiving data to and from disks of other storage systems through a communication link;
   wherein each main memory of the first and second storage systems includes a file system-processing unit managing storage areas of a disk so that files are correlated with locations on the disk and a file-system cache to be used by said file system-processing unit;
   wherein the disk-control unit of said first storage system receives contents of a file undated in the second storage system and a history of file-management information from the second storage system through said communication link, without using the file server of said second storage system that is connected to the disk of said second storage system, and stores the contents of a file and the history of file-management information on the disk cache of said first storage system;
   wherein the file system-processing unit of said first storage system monitors the history of the file-management information on the disk cache of the first storage system and updates the file-management information in the file-system cache of said first storage system in accordance with the update of the file in said second storage system if a chance in the history of the file-management information on the disk cache of the first storage system has occurred; and wherein, when said first storage system receives a read request from a client, said first storage system refers to the file-management information updated in said file-system cache, reads, from the disk, the contents of the update file received from said second storage system, and transfers the contents to said client, wherein the file system-processing unit of said first storage system comprises:

a metadata-update monitor monitoring the update of metadata, including data for file management, by referring to a journal log, including a history of said management information; and a metadata-updating unit updating the metadata in said file-system cache when said metadata-update monitor detects the update of the file.

10. The network system of claim 9, wherein the file system-processing unit of said first storage system comprises, in addition to said metadata-update monitor and said metadata-updating unit, a file system-cache purger discarding user data in said file-system cache corresponding to the metadata when the metadata is updated by said metadata-updating unit.

11. The network system of claim 10, wherein the metadata-updating unit of said first storage system updates metadata temporarily stored in said file-system cache by monitoring the contents of the journal log on said disk, and wherein, in accordance with the update of said metadata, the file system-cache purger of said first storage system detects that the user data, including the contents of a file temporarily stored in said file-system cache, has been updated on said disk and discards said user data in said file-system cache.

12. The network system of claim 9, wherein the metadata-update monitor of said first storage system detects the update of the file by monitoring writing of data into a journal-log area on the disk.

* * * * *